United States Patent [19]
Camburn

[11] Patent Number: 5,552,175
[45] Date of Patent: Sep. 3, 1996

[54] PROCESS FOR SOLUBILISING AN ALPHA-GLUCAN CONTAINING FOODSTUFF

[75] Inventor: Philip A. Camburn, Slough, England

[73] Assignee: SmithKline Beecham p.l.c., Brentford, England

[21] Appl. No.: 211,857

[22] PCT Filed: Oct. 13, 1992

[86] PCT No.: PCT/GB92/01877

§ 371 Date: Apr. 15, 1994

§ 102(e) Date: Apr. 15, 1994

[87] PCT Pub. No.: WO93/07769

PCT Pub. Date: Apr. 9, 1993

[30] Foreign Application Priority Data

Oct. 17, 1991 [GB] United Kingdom .................. 9122109

[51] Int. Cl.$^6$ ............................................. A23L 1/10
[52] U.S. Cl. .................... 426/615; 426/516; 426/590; 426/618
[58] Field of Search .................... 426/590, 516, 426/615, 618

[56] References Cited

U.S. PATENT DOCUMENTS

| | | | |
|---|---|---|---|
| 3,159,505 | 12/1964 | Burgess et al. ............. | 127/32 |
| 3,579,352 | 5/1971 | Bookwalter et al. ......... | 426/598 |

FOREIGN PATENT DOCUMENTS

| | | |
|---|---|---|
| 0087847 | 9/1983 | European Pat. Off. . |
| 0110549 | 6/1984 | European Pat. Off. . |
| 0139755 | 5/1985 | European Pat. Off. . |
| 0225110 | 6/1987 | European Pat. Off. . |
| 1472955 | 3/1967 | France . |
| 2268473 | 11/1975 | France . |
| 2432842 | 3/1980 | France . |
| 50-18642 | 2/1975 | Japan . |
| 60-87774 | 5/1985 | Japan . |
| 919906 | 2/1963 | United Kingdom . |

OTHER PUBLICATIONS

S. Budavari et al. 'the merck index, eleventh edition.' Merck, Rahway, N.J., U.S.A. p. 1386 see 8757. Starch.
Journal Of Food Science vol. 49, 1984, Chicago US M.H. Gomez et al. 'A physiochemical model for extrusion of corn starch' cited in the application pp. 40–43, 63 see the whole document.
Cereal Chemistry vol. 52, No. 3, Jun. 1975, Minneapolis US pp. 283–297 C. Mercier et al. 'Modicilation of carbohydrate components by extrusion–cooking of cereal products' see the whole document.

*Primary Examiner*—Esther M. Kepplinger
*Assistant Examiner*—Lien Train
*Attorney, Agent, or Firm*—William T. King; Stuart R. Suter; Edward T. Lentz

[57] ABSTRACT

A process for solubilising an alpha-glucan containing foodstuff which comprises processing a carbohydrate-containing material having a moisture content of less than 40% by weight in an extruder under severe conditions of mechanical disruption and shear at high screw speed. The solubility of the extrudate after milling is greater than 55% by weight in water. Novel soluble alpha-glucan components of the extrudate are provided having a ratio of greater than 1 for the amount of alpha-glucan having a degree of polymerisation greater than 50 to the amount of alpha-glucan with a degree of polymerisation less than 50. Food drinks comprising ingredients produced using the process are described.

14 Claims, 4 Drawing Sheets

PROCESS FOR SOLUBILISING AN ALPHA-GLUCAN CONTAINING FOODSTUFF

The present invention relates to food drink products, for example those of the "malted food drink" type. In particular the invention relates to a process for use in the production of such products and novel products produced thereby.

BACKGROUND OF THE INVENTION

Powdered food drink products are used world wide, for example as a bedtime drink and/or as a nutritive drink, one of the most famous being the malted food drink product sold under the trade mark Horlicks. Such products are characterised by a smooth mouth feel with body and are ideally of high solubility in water or milk added by the consumer. The detailed processes by which Horlicks and related food drinks are made have been trade secrets for many years but it is known that they are prepared from cereals whose starch is completely solubilised by malt enzymes derived from sprouted barley. The process further involves blending the solubilised product with milk products, sugar and other ingredients, cooking and drying.

Known processes for preparing powdered food drink products are not only complex, but suffer from the disadvantage that they are expensive since a great deal of water is used and this must be removed by heating in order to produce the powdered product.

DESCRIPTION OF THE PRIOR ART

Extrusion-cooking has been widely utilised in the food industry, in particular for the production of pet foods, snack foods and breakfast cereals. In such known extrusion processes solubility of the end product in liquids such as water is undesirable because it is generally important that the end product stays particulate and crisp in the presence of liquids. Such processes tend to produce a mixture of gelatinized granules (digestible but not soluble) and dispersed and fragmented starch molecules (soluble and digestible) as reported by Gomez, M. H. and Aguilera, J. M. in J. Food Sci. (1984) 49, 40–43. This is also the case in binders where high solubility is deleterious (see U.S. Pat. No. 3,159,505). It is also important that the end product does not become sticky or soft in moist air, which is a problem associated with the hygroscopicity of the resulting product.

Extrusion-cooking has also been used for the manufacture of pregelatinised 'instant' flours (e.g. as disclosed in GB 919,906) and starches which have cold-water swelling properties. In such products the granular nature of the native starch remains mostly intact in order to provide such swelling and thickening properties. The product is not truly soluble in water although the term 'soluble' is often incorrectly used in the literature in this context (see for example U.S. Pat. No. 4,465,702). The term 'instant' just means that no cooking is required; it does not imply that the product is soluble in water.

For the above applications the mechanical severity and starch dispersing action of the extrusion process has to be limited. Consequently little attention has been paid to using extrusion-cooking in the production of products in which high solubility is specifically desirable.

French Patent Application No. 2 268 473 (Institut National de la Recherche Agronomique) discloses the potential of extruding potato starch at low screw speed, high temperature and moderate moisture content to give enhanced solubility. An essential feature of this known process is that additional heat is supplied to the extruder. In addition, this publication does not teach the production of a food drink from the extruded material nor does it disclose the application of extrusion-cooking in the production of a food drink from other sources such as cereal flours. In fact, cereal starches, when processed by these authors, were reported to give a product of not more than 50% by weight solubility without significant structural degradation. The same publication discloses the production of novel ingredients by the process. Such ingredients are characterized by being soluble in 80% ethanol and having a degree of polymerization between 1 and 14. A disadvantage of such products are that they are hygroscopic, requiring that they must be sealed in moisture-proof sacks.

SUMMARY OF THE INVENTION

The present invention is based on the discovery that considerable improvements can be made in the manufacture of food drink products by the use of extrusion techniques so as to subject the feed material to severe mechanical disruption and shear, at high screw speed. This is for example by the use of multiple, sequential high sheer sections. In particular the starch content of the feed material is completely solubilised by the very high dispersing action and the severe mechanical shear at high screw speed.

It has now also been found that by judicious use of the screw design of the extruder and extrusion parameters in order to maximize dispersion and fragmentation it is possible to make a new product which possesses the desirable functional properties of high solubility in liquids (particularly water), low viscosity, smooth mouth feel and body. The body is usually attributed to the presence of higher degree of polymerization dextrins (ie. degree of polymerization greater than 14).

According to the present invention there is provided a process for solubilising an alpha-glucan containing foodstuff which process comprises processing a carbohydrate-containing material having a moisture content of less than 40% by weight in an extruder under severe conditions of mechanical disruption such that when the carbohydrate is an alphaglucan, the soluble alpha-glucan component of the extrudate has a ratio of greater than 1 for the amount of alpha-glucan having a degree of polymerisation greater than 50 to the amount of alpha-glucan with a degree of polymerisation less than 50 and such that the true solubility of the foodstuff after milling is greater than 55% by weight in water. Preferred materials for extrusion according to the present invention are foodstuffs prepared from cereals and other plants.

Preferably the extruder is a screw apparatus with at least two high shear sections. In one aspect the extruder is a twin screw apparatus. A suitable preferred twin screw extruder for use in the process according to the invention is a co-rotating apparatus with fully intermeshing, self-wiping screw elements. Apparatus manufactured by APV-Baker (Peterborough, U.K.), Bühler Uzwil (Switzerland) or Werner and Pfleiderer GmbH (Stuttgart, W. Germany) may suitably be used. A single screw apparatus may also be used.

Typically the screw speed will be in the range 300 to 1000 rpm and die diameter in the range 0.5 to 5 mm. In a preferred process the die plate of the extruder is absent so that the extruder barrel is open ended.

Suitably the temperature developed during the extrusion process is in the range 150°–250° C., preferably 190°–210°

C. Preferably the process is carried out by 'autogeneous' extrusion (ie without recourse to an additional external source of heat). The temperature generated during extrusion is an indication of the severity of the process and reflects the degree of energy dissipation. Normally the pressure developed during the extrusion process is in the range 100 to 2000 psi, usually 300–1500 psi.

It will be appreciated that the severity of the conditions under which the process is carried out can be varied to produce the desired products and will depend amongst other things on the type of extruder used.

According to the present invention, the process is not dependent on particular chemical or biochemical conditions (including enzymatic) of the sample to be extruded. In particular the process need not be carded out under acid conditions or in the presence of enzymes.

In a particular embodiment of the present invention there is provided a process for preparing a food drink ingredient which process comprises processing a starch bearing foodstuff in an extruder cooker at low moisture content and under sufficiently severe conditions of mechanical disruption to give an extrudate which has, when the process is carried out in the absence of added sweetening agents, a dextrose equivalent of less than 8 and after milling, a true solubility of greater than 55% by weight in water. Such a product is distinguished from many previously extruded starch-bearing products in that the proportion of the starch solubilised is close to 100%. The skilled person will readily appreciate applications other than in food drinks for the process and for the products produced according to the process of the present invention.

An important advantage of the process is one of economy since the cost of removing water before a suitable product can be obtained is reduced or even eliminated. The process is also simpler than those already known for the manufacture of food drinks and can be used to give products with new and interesting flavours.

A particularly useful feature of the present invention is the ability to produce a non-sweet extrudate wherein the extrudate acts as a soluble bulking agent in the production of savoury-type drinks. A measure of sweetness is given by the dextrose equivalent value (DE value). Dextrose equivalent values can for example be calculated on the basis of the ferricyanide number determination [Schoch, T. J. in Methods in Carbohydrate Chemistry. Vol. 4. R. L. Whistler ed., Academic Press Inc., New York. p 64 (1964)].

Further advantages of the process are the enhanced range of solubility and viscosity performance and economy in flavour development.

It will be appreciated by those skilled in the art that the screw design, screw speed, design of die or other restriction used for extrusion, feed rate and moisture content of the starch-bearing foodstuff fed into the extruder cooker can and should be chosen to optimise starch dispersal/disaggregation by viscous dissipation of motor energy at high shear rate. Under such conditions the starch is simultaneously melted and the macromolecules dispersed giving solubility. In addition, a degree of macromolecular degradation can be brought about to give "macrodextrins" of intermediate-to-high molecular weight (eg. having a degree of polymerization mainly between 50 and 50,000). Such "macrodextrins" are characterized by being highly soluble in water, giving low viscosity solutions which impart appropriate body and mouthfeel.

In a preferred aspect the process of the invention comprises the additional step of milling the extrudate in a conventional manner so that a food drink powder is obtained.

The extrudate obtained by the process of this invention has, after milling, a true solubility of greater than 55% by weight in water, preferably greater than 70% by weight solubility in water and typically 80% solubility by weight in water or more. The above 'true solubility' figure is obtained after gentle dispersion of the material in water, centrifugation and analysis of soluble material in the supernatant solution by drying. Unlike certain prior art determinations of 'water solubility' (see for example U.S. Pat. No. 4,465,702) this method of solubility determination does not involve a high speed blending step which would cause further rupture of swelled granular structures and artificially exaggerate solubility. The method described above is believed to give a more accurate indication of true solubility.

The aqueous solution normally has a low viscosity, preferably below 100 mPas, more preferably below 5 mPas at 70° C. for a 6% by weight solution.

Preferably a processing aid is incorporated into the process of the invention. Processing aids may include ingredients which influence pH, redox potential, enzyme activity, hydrogen bonding and/or other aspects of the environment or intermolecular relationships inside the extruder. Processing aids may include one or more of antioxidants (e.g. ascorbic acid ascorbyl palmitate and the tocopherols), sulphur dioxide, metal salts, acids, alkalis and surfactants such as lecithin and starch plasticisers e.g. calcium chloride. One preferred processing aid is phosphoric acid. Other acids such as citric acid may be used. Advantageously, citric acid can be used because it exhibits enhanced sequestering ability.

The use of acids for acid—thinning in extrusion processes is described in Kervinen, R., Suortti, T. Olkku, J. and Linko, P. Lebensmittel-wissenschaft und Technologie (1985) 18, 52–59 and in Faubion, J. M. Hoseney, R. C. and Seib, P. A. Cereal Foods World (1982) 27 (5), 212–216.

While the present process is distinguished in that the previously described advantages of the present invention can be obtained in the absence of acid, acids such as citric acid or phosphoric acid may be used to prevent burning which could otherwise occur under conditions of severe mechanical shear. These acids may also be used to sequester polyvalent cations which would otherwise tend to act as catalysts of oxidation.

Suitable techniques for analysing the extrudate will be apparent to the person skilled in the art and include, for example, gel permeation chromatography (GPC). In general any suitable chromatographic system can be used (for example using aqueous GPC or other suitable polymethylacrylate gels) combined with an appropriate detection system. A suitable analytical system and protocol is described in the Examples below. Gel permeation chromatography in conjunction with low angle light scattering could also be used to characterise in greater detail the molecular size of the soluble fraction of the extrudate. Analytical ultracentrifugation could also be used to characterise the molecular weight of the extrudate. Other suitable techniques are described in Harding, S. E. et al. (1991) Advances in Carbohydrate Analysis, 1, 63–144.

The soluble fraction of the extrudate produced according to the present invention can be shown by size exclusion chromatography to be of intermediate-to-high molecular size, that is between pre-gelatinised starch and enzymatically hydrolysed starch.

In a further aspect the present invention provides novel products obtainable by using the process according to the invention.

It has been found that under typical extrusion conditions the ratio of solubilized alpha-glucan bearing a degree of polymerization (D.P.) greater than 50 to that with a DP less that 50 (hereinafter referred to as $K_{\alpha 50}$) is always greater than 1. The same ratio applied to enzymically degraded, or acid-dextfinized starches is less than 1. This $K_{\alpha 50}$ ratio is therefore characteristic of the extruded "macrodextrins".

One advantage of the present invention is that the intermediate molecular size of the "macrodextrins" means that they are fully available for digestion but are in line with general current health recommendations for a change to more complex carbohydrates in the diet. A further advantage is that such "macrodextrins" are not hygroscopic and therefore are less likely to create the storage problems that can be associated with lower molecular weight dextrins such as those produced by enzymic or acid-degradation.

Suitable starch/alpha-glucan bearing foodstuffs of low moisture content for use in the process of the invention include any cereal, tuber or legume flour or their starches.

Preferably the starch-bearing foodstuff is treated by steam or by other processes (for example pre-gelatinisation) either prior to or after extrusion. Steam treating can be used to inactivate lipid spoiling enzymes which would otherwise encourage rancidity. Preferably additions can also be made to the treated or untreated starch-bearing foodstuff prior to or after extrusion.

Surprisingly it has been found that the process of the present invention is able to yield a food drink ingredient with desirable properties, particularly high water-solubility, from sources such as wheat flour which have hitherto been regarded as difficult to solubilise or degrade by extrusion.

Thus in a preferred aspect of the invention, the starch bearing foodstuff is a cereal flour (for example wheat or barley). When cereal flours are used these are preferably free from bran which is removed in standard milling processes.

The present invention also provides an ingredient for food drinks substantially derived from cereal flour and obtained by an extrusion process, said ingredient having a true solubility after milling of greater than 55% by weight in water.

As used herein the term 'low moisture content' means that 0 to 40% by weight of the starch bearing foodstuff is water, preferably 15 to 20% by weight. Ideally, the moisture content is such that the extrudate does not require drying before or after any milling step.

Preferably the food drink ingredient prepared by the process of the invention is flavoured. This is usually done by the addition of naturally flavoured foods such as cocoa and/or flavouring additives. However, in one aspect of the invention flavour may be developed during the process of the invention by the addition of one or more flavour potentiating substances, for example sugars, amino acids, proteins and fats. In another aspect the starch-bearing foodstuff is a pre-flavoured feed material which is optionally extruded in the presence of flavour potentiating substances as described above.

In a preferred aspect the pre-flavoured feed material comprises a malted cereal flour so that a malted food drink product, preferably a malted food drink powder, is obtained.

It will be appreciated that further ingredients may optionally be added in the process of the present invention or to the final food drink ingredient, for example sweeteners, additional fibre, proteins, fats, vitamins and minerals. Added fats or protein ingredients used in the process of the present invention for the purposes of nutrition, flavour enhancement and the development of body may be those used in conventional processes, and may be derived, for example, from milk, egg or vegetable sources. Ingredients subject to a loss of nutrients during high temperature cooking are added at a late stage of extrusion, or are added by dry mixing following extrusion.

BRIEF DESCRIPTION OF THE DRAWINGS

FIG. 1 shows in cross-section the extruder barrel assembly 1 of an extruder cooker having a solids feed inlet port 2 and a liquid feed inlet 3. The central screw (not cross-hatched for clarity) consists of a number of different elements mounted co-axially on a hexagonal extruder drive shaft 10 and secured by a screw end cap 9. The screw comprises forward-feeding screw elements 4, reduced pitch forward feeding screw elements 5 and a number of high-shear working sections 6 consisting of reverse-feeding kneading paddles (see FIG. 3a and b for explanation) mounted at 60° relative to each other. In use the solids feed is introduced through 2 and the expanded product is extruded through the high restriction die plate and hole 8.

FIG. 2 shows a similar arrangement except that there are high-shear working section 7 consisting of alternating reverse-feeding and forward-feeding screw elements (see FIG. 4 for explanation) in place of kneading panels 6 and the die plate and hole 8.

PREFERRED EMBODIMENT

Figure 1:
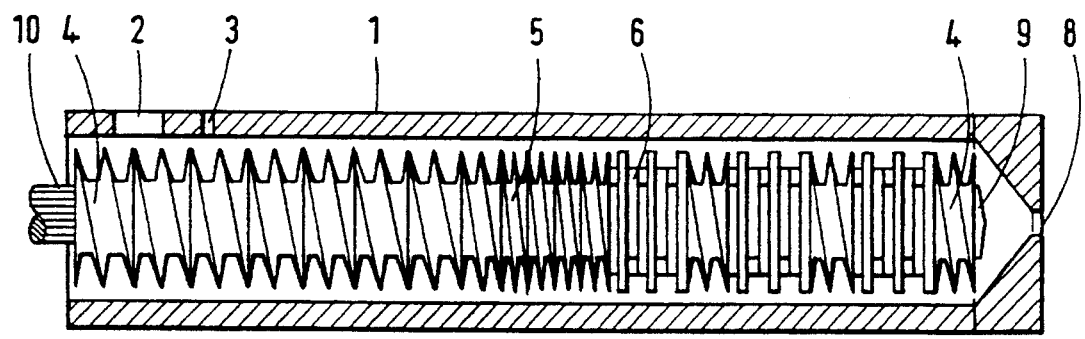
FIGS. 1, 2, 3(a), 3(b) and 4 demonstrate an extruder cooker with its associated parts.

In a preferred process according to the present invention, water is pumped into the extruder through liquid feed inlet 3 at a rate sufficient to raise the moisture content of the feed to 18% (wet basis) when the solids feed rate is 150 kg/hr. Screw speed is maintained at 450 rpm and the feed extruded autogeneously (i.e. with no external heat input) through two 2 mm diameter cylindrical dies having a land-length of 4 mm. The product emerging from the dies expands into a thin rope due to vaporisation of steam and the rope is cut into pellets of manageable size by means of rotating cutter blades adjacent to the face of the die carrier plate and hole 8.

The invention will now be illustrated by way of Examples.

EXAMPLE 1

A powdered food drink base was prepared as follows. A commercial sample of malted wheat was reduced in a roller mill to give a malted wheat flour of approximately 80% extraction. The malted wheat flour was then blended with other ingredients in the following proportions:

72% extraction biscuit flour 86.7%

Malted wheat flour 5.0%

Skimmed milk powder 7.5%

Citric acid 0.75%

Ascorbic acid 0.05%

The blend was then metered into the feed zone of an APV (formerly Baker-Perkins) MPF50 MK2 twin-screw extruder configured as illustrated diagrammatically in FIG. 1 (not drawn to scale). Under typical autogeneous extrusion the following steady-state conditions are observed.

Die Pressure 420 psi

Die Temperature 194° C.

Specific Mechanical Energy Input 0.124 kWh/kg

The moisture content of the pellets is reduced, by vaporisation of water at "flash-off" and on subsequent cooling, to 7–8%. This can be further reduced by drying at 75°–80° C. in a fluidised bed dryer to about 5%. The dried, expanded pellets are then milled to below 200 microns.

The resulting powder is a pleasant tasting malted drink base material of low bulk density (0.1 g/ml) but excellent functional properties.

True solubility in water 80% at 30° C.

Viscosity of 6% solution 4 mPas at 70° C.

EXAMPLE 2

A powdered malted food drink was prepared as follows:

A blend of malted wheat flour, 72% extraction biscuit wheat flour, skimmed milk powder and Ascorbic acid was produced as described in Example 1, except that the citric acid was replaced by phosphoric acid which was introduced in the liquid feed port.

Figure 2:
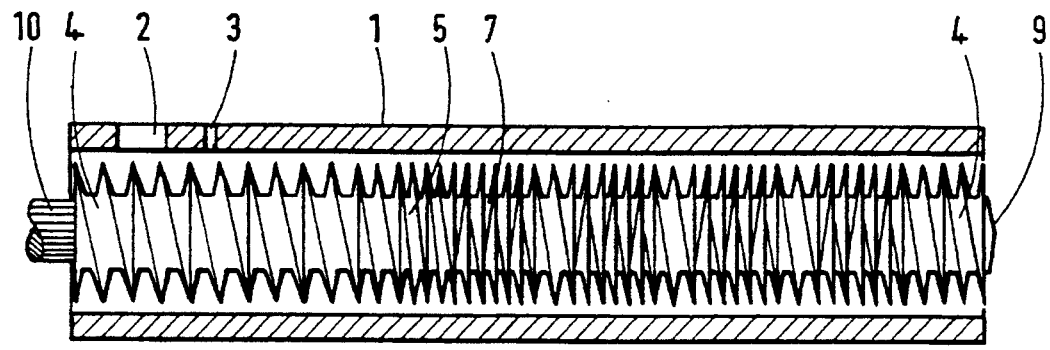
Figure 3A:
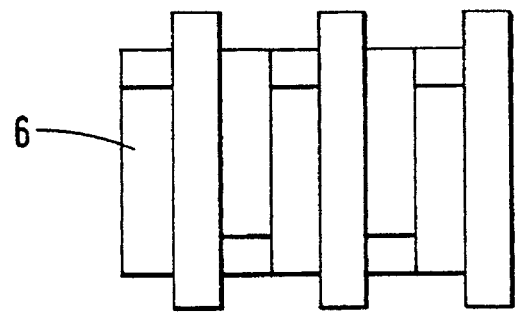
Figure 3B:
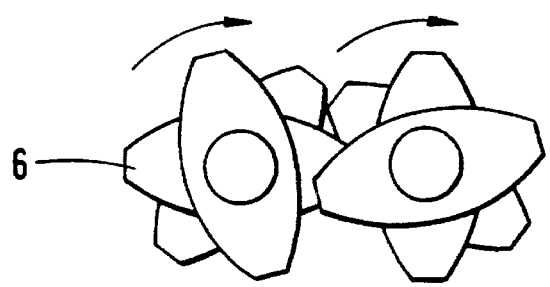
Figure 4:
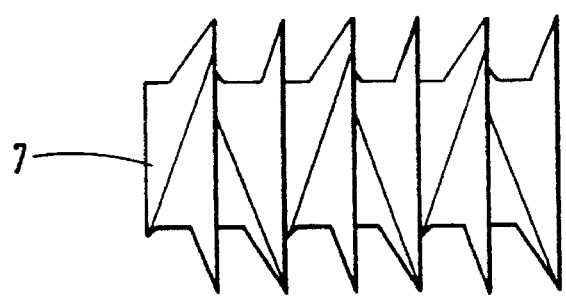

The blend was then metered into the feed zone of a Bühler DNDG62 twin-screw extruder configured as illustrated diagrammatically in FIG. 2 (not drawn to scale).

A solution of phosphoric acid in water was pumped into the extruder through liquid feed inlet 3 at a rate calculated to give a phosphoric acid addition level of 0.75% and a total moisture content of 19% at a solids feed rate of 245 kg/hr. Screwspeed was maintained at 450 rpm and the feed extruded autogeneously. After passing through the final high-shear working section the feed expanded as the moisture vaporised and then was recompressed by the subsequent feedscrew elements. This effected an efficient separation of product and steam. The product emerged gently from the base of the barrel opening in manageable disjointed segments of similar profile to the screw elements. The steam emerged from the top of the barrel opening and was vented to the atmosphere. No cutter was required to handle the product.

Under autogeneous extrusion the following steady-state conditions were observed:

Maximum temperature 188° C.

Maximum pressure 200 psi

Specific Mechanical energy Input 0.145 kWh/kg

The moisture content of the product was reduced, by vaporisation of water during "flash-off" and on further cooling, to 5–6%. The product was subsequently milled to give a powder with a particle size below 200 microns and the following functional properties.

True solubility in water 78% at 30° C.

Viscosity of 6% solution 3 mPas at 70° C.

Bulk Density 0.7 g/ml

The powder was subsequently blended further with sugar, milk powder and minerals in the following proportions:

Powdered extrudate 72.5%

Sugar (sucrose) 24.0%

Skimmed milk powder 2.0%

Sodium chloride 0.85%

Potassium bicarbonate 0.65%

Such a blend may be mixed with wrter or milk to give a pleasant tasting, creamy, malted food drink.

EXAMPLE 3

A powdered chocolate-malt food drink was produced as described in example 2 except that the solids feed to the extruder was pre-blended as follows:

72% extraction biscuit flour 72.5%

Malted wheat flour 7.5%

Cocoa 20.0%

A solution of phosphoric acid in water was pumped into the extruder through liquid feed inlet 3 at a rate calculated to give a phosphoric acid addition level of 0.75% and a total moisture content of 19% at a solids feed rate of 245 kg/hr.

The feed was extruded autogeneously as described in Example 2, cooled and milled to a fine powder with the following functional properties:

True solubility in water 74% at 30° C.

Viscosity of 6% solution 4.5 mPas at 70° C.

Bulk Density 0.5 g/ml

The powder was further blended with other ingredients in the following proportions:

Powdered extrudate 30.0%

Malted wheat flour 10.0%

Sugar 38.0%

Skimmed milk powder 15.0%

Cocoa 7.0%

The resulting blend may be mixed with water or milk to give a pleasant tasting chocolate-malt food drink.

EXAMPLE 4

A powdered coffee-malt food drink was produced as described in Example 3 except that the solids feed to the extruder was pre-blended as follows:

72% extraction biscuit flour 85.5%

Malted wheat flour 7.5%

Coffee 7%

The blend was extruded and milled as described in Example 3 and subsequently dry blended with other ingredients as follows:

Powdered extrudate 50%

Sugar 29.1%

Semi-instant skimmed milk powder 20%

Sodium chloride 0.5%

Potassium bicarbonate 0.4%

The resulting blend may be mixed with water or milk to give a coffee-flavoured malted food drink.

EXAMPLE 5

A powdered malted food drink was prepared as described in example 2 except that the number of high shear working sections was reduced to only two. The solids feed to the extruder was preblended as follows:

Tapioca starch 90%

Malted wheat flour 5%

Sugar 5%

The mix was pre-wetted by means of a fine water spray operating during the mixing action. Further water was pumped into the extruder at a rate sufficient to give a total moisture content during extrusion of 19% at a solids feed rate of 100 kg/hr.

Under autogeneous extrusion the following steady-state conditions were observed:

Maximum temperature 148° C.

Specific mechanical energy 0.158 kWh/kg

The resulting extrudate was cooled and milled to a fine powder with the following attributes:

True solubility in water 88%

Viscosity of 6% solution 6.7% mPas $K_{\alpha50}$ 32

The powder was further blended with other ingredients in the following proportions:

Powdered extrudate 41%

Malted wheat flour 18%

Sugar 17½%

Skimmed Milk Powder 12½%

Whey Powder 8%

Minerals/Flavourings 3%

The resulting blend may be mixed with water or milk to give an excellent malted food drink of smooth creamy texture. The finished blended powder demonstrated a $K_{\alpha50}$ of 13.

EXAMPLE 6

Extrudates were analysed according to the following procedure. 1 g dry sample was placed in 100 ml boiled distilled water and stirred gently for 10 minutes. The solids were separated either by filtration (Whatman GFF filter paper, Whatman Ltd, Maidstone, Kent) or by centrifugation and the solute subjected to gel permeation chromatography using a system equipped with four columns consisting of a pre-column and three Waters separating columns (obtainable from Millipore Waters, UK) which were packed with 'Ultrahydrogel' (aqueous GPC): Column 1; Waters 1000, Column 2; Waters 500, and Column 3 Waters 250. All columns were 300 mm in length. The detection system used was a Waters 410 refractometer. Peak analysis was made using Waters baseline 810 software with GPC option.

The system was calibrated using calibration standards having a molecular weight range of 738–853,009 (eg. 'Pullulan standards' obtained from Polymer Labs) which were constituted in 0.1M lithium bromide in water. The samples (150 μl) were eluted using 0.1M lithium bromide in water. The isocratic solvent flow rate was 0.8 ml per minute.

The chromatographic profiles produced were analysed and the area under the curves determined by a computer automated system of integration to determine the amount of material present having a particular molecular size.

Figure 5:
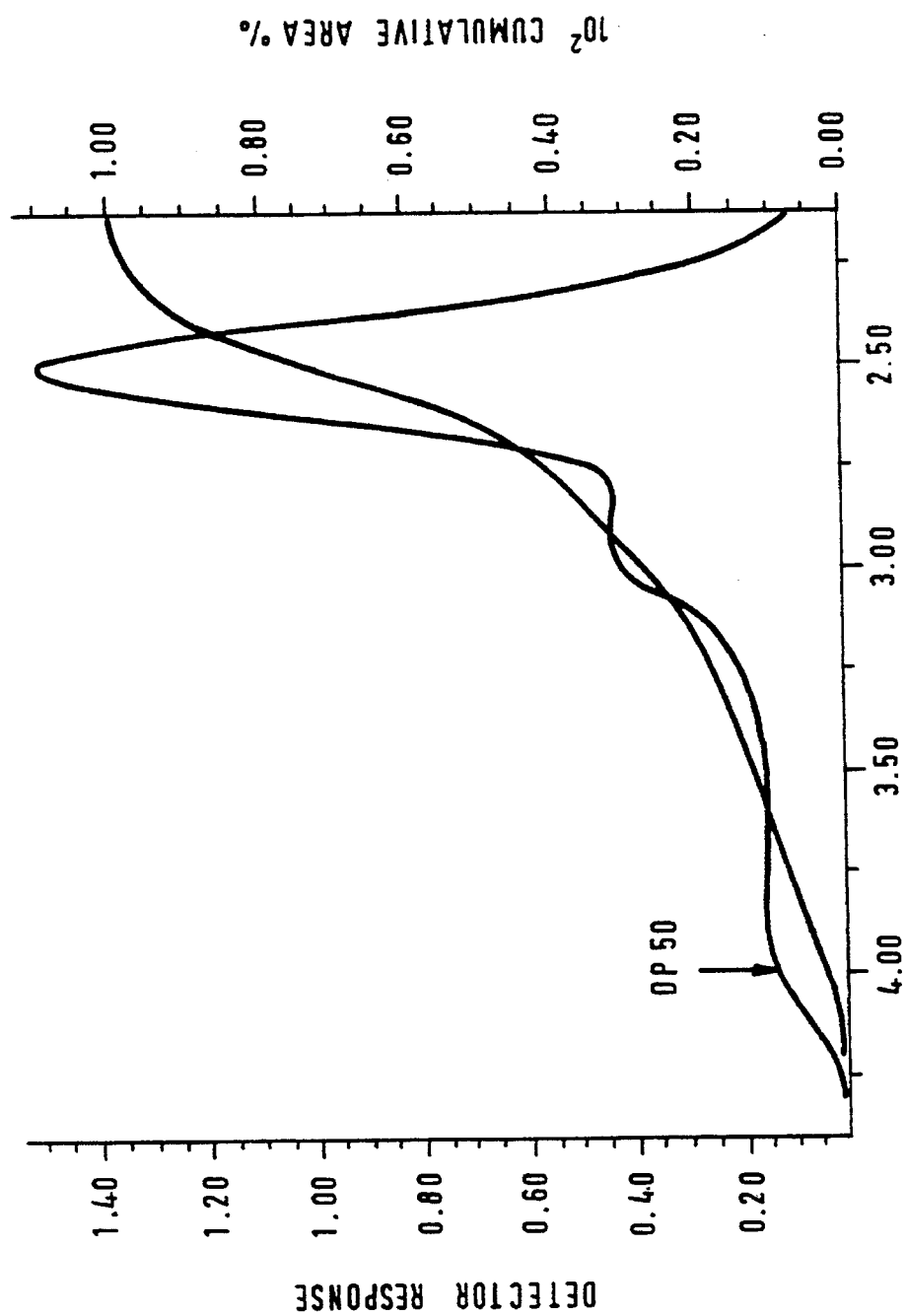
FIGS. 5 and 6 represent graphs which show sample profiles relating to molecular weight and polymerization. The invention is illustrated by the following Examples, and accompanying FIGS. 1 to 4 which are schematic (i.e. not to scale).
Figure 6:
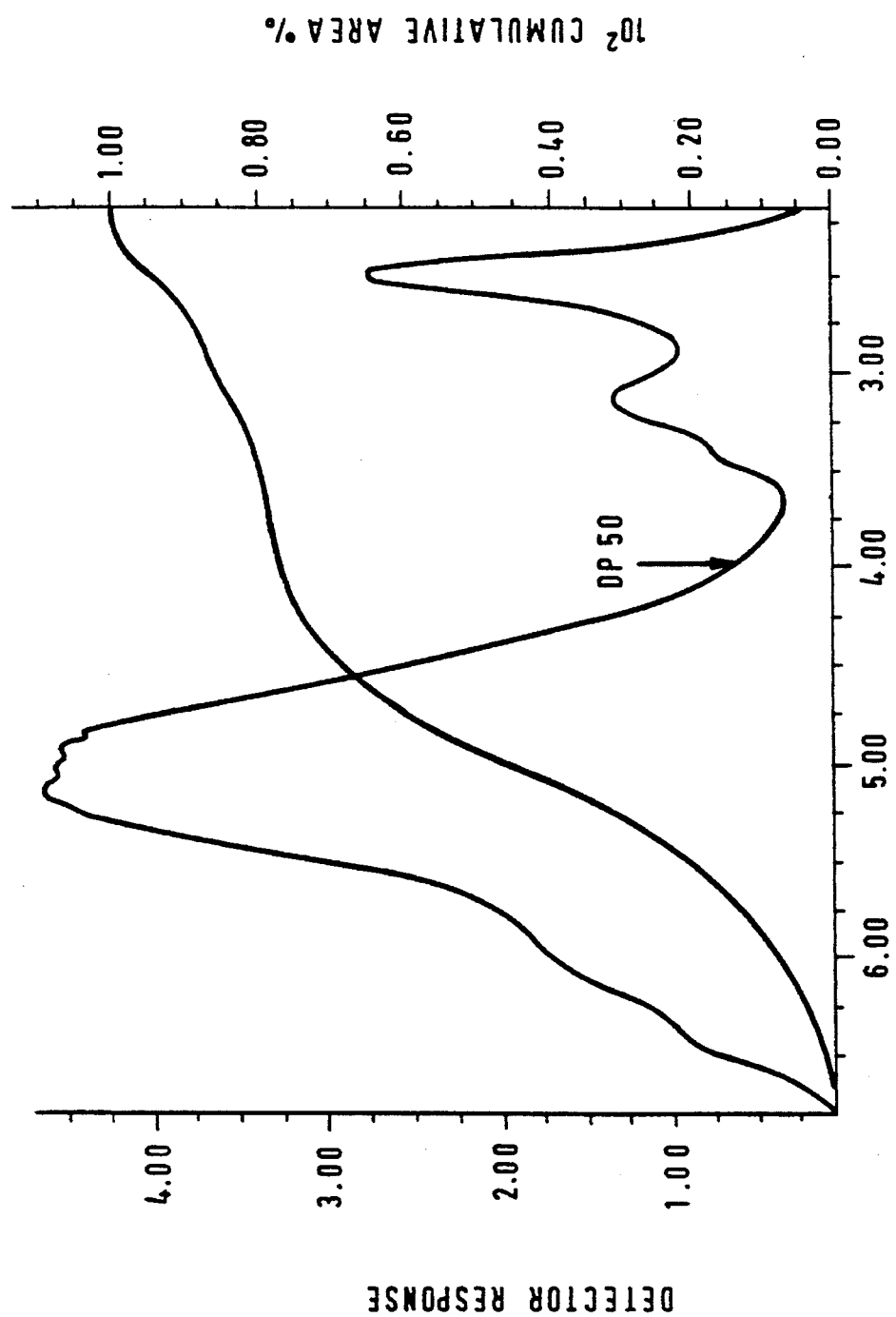

FIGS. 5 and 6 show sample profiles. FIG. 5 shows a commercial sample of enzymically-hydrolyzed potato dextrins and FIG. 6 shows an extruded malt drink (cereal). Molecular size was related to degree of polymerisation assuming 8000 daltons to approximate to a degree of polymerisation of 50. The ratio of the amount of soluble material having a degree of polymerisation greater than 50 to that with a degree of polymerisation of less than 50 was determined.

The results for samples analysed in this way are shown in Table 1 below.

TABLE 1

| Sample | $K_{\alpha50}$ |
| --- | --- |
| Enzymatically hydrolysed potato dextrin | 0.026 |
| enzyme hydrolysed malt drink | 0.11 |

TABLE 1-continued

| Sample | $K_{\alpha50}$ |
| --- | --- |
| extruded cereal base | 6.69 |
| extruded malt drink | 3.54 |

I claim:

1. A process for solubilising an alpha-glucan containing foodstuff which process comprises processing an alpha-glucan containing carbohydrate material having a moisture content of less than 40% by weight in an extruder under severe conditions of mechanical disruption and shear having a specific mechanical energy input of from about 0.124 k/Wh/Kg to about 0.16 k/Wh/Kg to produce an extrudate which contains soluble alpha-glucan and milling said extrude to give a powder with a particle size of below 200 microns, the soluble alpha-glucan component of the extrudate having a degree of polymerization of from about 50 to about 50,000 and a weight ratio a degree of polymerization greater than 50 to the amount of alpha-glucan with a degree of polymerisation less than 50 is greater than 1 and such that the true solubility of the soluble alpha glucan after milling is greater than 55% by weight in water.

2. A process as claimed in claim 1 wherein the extruder is a screw apparatus with at least two high shear sections.

3. A process as claimed in claim 2 wherein the extruder has twin screws.

4. A process as in claim 1 wherein the process is carried out under acid conditions.

5. A process as claimed in claim 2 wherein the screw speed is in the range 300 to 1000 rpm.

6. A process as claimed in claim 2 wherein the die plate is absent so that the extruder barrel exit is open ended.

7. A process as claimed in claim 1 wherein the temperature developed during the extrusion process is in the range of 150°–250° C.

8. A process as claimed in claim 1 which is carried out without an additional/external source of heat.

9. A process as claimed in claim 1 in which citric acid is present in the extruder.

10. An extruded alpha-glucan containing product obtainable by a process as defined in claim 1 having a degree of polymerization of from about 50 to about 50,000 and wherein the ratio of the amount of soluble alpha-glucan having a degree of polymerisation greater than 50 to that with a degree of polymerisation less than 50 is greater than 1 and the true solubility of the product is greater than 55% by weight in water.

11. An extruded product as claimed in claim 10 wherein the true solubility of the product is greater than 80% by weight in water.

12. An extruded product as claimed in claim 10 wherein the alpha-glucan containing product is a flour or starch of a cereal, tuber, root or legume.

13. A food drink ingredient comprising an extruded product as defined in claim 10.

14. A food drink comprising malted cereal flour which has been extruded according to claim 1.

* * * * *